United States Patent [19]
Andersson et al.

[11] Patent Number: 5,928,073
[45] Date of Patent: Jul. 27, 1999

[54] METHOD AND APPARATUS FOR REMOVING THE SKIN CASING FROM A SAUSAGE

[75] Inventors: Ulf Andersson; Lars Bårdén; Anders Rosengren, all of Halmstad, Sweden

[73] Assignee: Peeler System AB, Halmstad, Sweden

[21] Appl. No.: 08/849,387

[22] PCT Filed: Nov. 27, 1995

[86] PCT No.: PCT/SE95/01412

§ 371 Date: Jun. 3, 1997

§ 102(e) Date: Jun. 3, 1997

[87] PCT Pub. No.: WO96/17522

PCT Pub. Date: Jun. 13, 1996

[30] Foreign Application Priority Data

Dec. 6, 1994 [SE] Sweden .................................. 9404242

[51] Int. Cl.$^6$ ................................................ A22C 13/00
[52] U.S. Cl. ............................................................ 452/50
[58] Field of Search ................................................ 452/50

[56] References Cited

U.S. PATENT DOCUMENTS

| | | | |
|---|---|---|---|
| 2,424,346 | 7/1947 | Wilcoxon | 452/50 |
| 2,672,646 | 3/1954 | Demarest et al. | |
| 2,689,971 | 9/1954 | Grey | 452/50 |
| 3,487,498 | 1/1970 | Grandon et al. | 452/50 |
| 3,487,499 | 1/1970 | Klyce | 452/50 |
| 4,024,602 | 5/1977 | Stiles | |
| 4,222,150 | 9/1980 | Anderson | |
| 4,414,707 | 11/1983 | Koken | 452/50 |
| 4,637,095 | 1/1987 | Maruska | |
| 4,682,387 | 7/1987 | Leining | 452/50 |

FOREIGN PATENT DOCUMENTS

| | | | |
|---|---|---|---|
| 2295474 | 5/1989 | Japan | 452/50 |

*Primary Examiner*—Willis Little
*Attorney, Agent, or Firm*—Smith, Gambrell & Russell, LLP; Beveridge, DeGrandi, Weilacher & Young Intellectual Property Group

[57] ABSTRACT

A method of removing the skin casing from a sausage by slitting the sausage (2) in its one end region comprises the steps that a flap of the skin casing is gripped by a gripper (15) in the immediate proximity of the slit. The gripped flap is displaced in relation to the sausage (2) in a direction transversely of the longitudinal direction of the sausage, preferably approximately tangential. The gripper and the sausage undergo a relative displacement in the longitudinal direction of the sausage. The sausage will, at least during a part of the removal operation of the skin casing, be caused to rotate approximately about its longitudinal axis. An apparatus for removing the skin casing from a sausage comprises a support arrangement (1) for the sausage, a rotation unit (6), which, by engagement with the sausage (2), is disposed to rotate the sausage approximately about its longitudinal axis on the support arrangement, a gripping unit (3) which has a knife for realizing a slit in the end region of the sausage, and at least one first gripper for gripping a flap of the skin casing in the immediate proximity of the slit. The apparatus also includes guides (4, 5) along which the rotation unit (6) and the gripping unit (3) for removing the skin casing of the sausage are movable in opposite directions approximately parallel with the longitudinal direction of the sausage.

27 Claims, 9 Drawing Sheets

Fig 9

METHOD AND APPARATUS FOR REMOVING THE SKIN CASING FROM A SAUSAGE

TECHNICAL FIELD

The present invention relates to a method of removing the skin casing from a sausage and comprises the steps that the sausage is slit in its one end region, that the skin casing of the sausage is gripped by a gripping device, that the gripping device and the sausage undergo a relative displacement in the longitudinal direction of the sausage, and that the sausage, at least during a part of the removal operation of the skin casing, is caused to rotate approximately about its longitudinal axis.

The present invention also relates to an apparatus for removing the skin casing from a sausage.

BACKGROUND ART

U.S. Pat. No. 4,637,095 discloses an apparatus for removing the skin casing from a sausage. This apparatus comprises two pairs of crosswise disposed drive or advancement rollers for the sausage which are intended to simultaneously longitudinally displace the sausage and rotate it about its longitudinal axis. The apparatus further includes a knife which is intended to produce a longitudinal incision in the one end region of the sausage. In addition, the apparatus disclosed in this US patent specification includes means with gripping rollers which are intended to grip a portion of the skin casing projecting from the end of the sausage and pull the skin casing from the sausage when this is advanced over the gripping rollers under rotation.

In such situations when the sausage has an excess portion of skin casing extending in the axial direction, the apparatus disclosed in the above US publication might possibly function. On the other hand, operational disturbances will most likely occur in such cases when the sausage skin casing has a metal retainer ring about the end portion of the sausage skin casing or if this end portion is so large that no grip can be achieved.

PROBLEM STRUCTURE

The present invention has for its object to devise a method intimated by way of introduction such that it may, with a high degree of operational reliability and rapidity, be employed for removing the skin casing from a sausage irrespective of the appearance of the end region of the sausage and irrespective of whether metal parts or the like are provided there. Further, the present invention has for its object to devise a method such that a high level of operational reliability may be achieved also in cases employing sausage skin casings of poor mechanical strength and hard adhesion to the sausage proper.

The present invention yet further has for its object to provide an apparatus for removing the skin casing from a sausage. Thus, the invention relates to such an apparatus which is easy to manage and is extremely reliable in operation, which is flexible and which, as a result, may readily be adapted to different types and sizes of sausages irrespective of the appearance of the skin casing at the ends of the sausage and largely irrespective of the mechanical strength of the skin casing and its adhesion to the sausage proper.

SOLUTION

The objects forming the basis of the present invention will be attained in respect of the method, where the method is characterized in that a flap of the skin casing is gripped in association with the slit, and that the gripped flap of skin casing is displaced in relation to the sausage in a direction transversely of the longitudinal direction of the sausage, preferably approximately tangential.

The objects forming the basis of the present invention will be attained in respect of the apparatus, where the apparatus is characterized by a support arrangement for the sausage; a rotation unit which, by engagement with the sausage, is operative to rotate the sausage on the support arrangement approximately about its longitudinal axis; a gripping unit which has a knife for producing a slit in the one end region of the sausage, and at least one first gripper for gripping a flap of the skin casing in association with the slit; and guide means along which the rotation unit and the gripping unit are movable in opposite directions approximately parallel to the longitudinal direction of the sausage for removing the skin casing from the sausage.

Further advantages will be attained according to the present invention if the method and/or apparatus is given one or more of the characterizing features as set forth in the appended claims.

BRIEF DESCRIPTION OF THE ACCOMPANYING DRAWINGS

The present invention will now be described in greater detail hereinbelow, with particular reference to the accompanying Drawings, in which.

DESCRIPTION OF PREFERRED EMBODIMENTS

Figure 1:
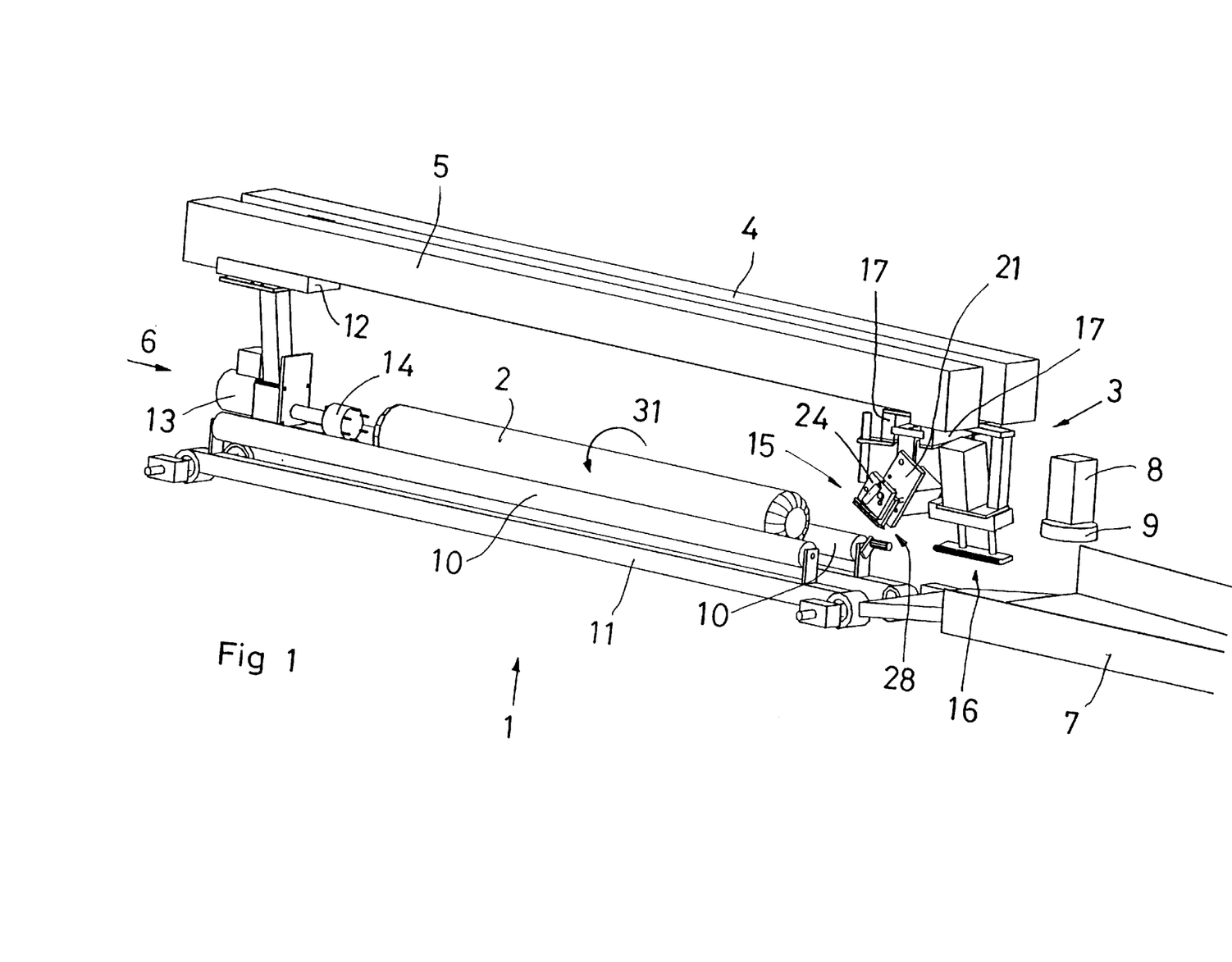
FIGS. 1–7 are perspective views of the subject matter of the present invention, in different positions of a working cycle.

Referring to the Drawings, FIG. 1 shows in perspective an apparatus for removing the skin casing from a sausage, in the starting position prior to the commencement of a working cycle. The apparatus comprises a support arrangement 1 which, in a manner not closely specified, is secured in the frame of the apparatus (not shown on the Drawings). The support arrangement 1 is intended for supporting and carrying a sausage 2. The subject matter of the present invention further includes a gripping unit 3 with at least a first gripper 15 and a knife 25 (see FIGS. 8–9) for producing an incision or slit 30 (FIG. 4) which is longitudinally directed in relation to the sausage and is placed in the one end region of the sausage. The gripping unit 3 is displaceably disposed along a guide 4 which is approximately parallel with the longitudinal direction of the sausage 2. The guide 4 is disposed over the support arrangement 1 and beside and approximately parallel with a second guide 5 which supports a rotation unit 6 which, by engagement with the sausage 2, is disposed to rotate the sausage on the support arrangement 1 approximately about the longitudinal axis of the sausage. The rotation unit 6 is further displaceably disposed along the guide 5, whereby the rotation unit 6 also serves the function of a power source for the sausage 2 when it is displaced in its longitudinal direction along the support arrangement 1. The guides 4 and 5 are provided with means for displacing the gripping unit 3 and the rotation unit 6, respectively.

Alternatively, the two guides 4 and 5 may be disposed on a lower level, for example one on either side of the support arrangement 1.

On displacement of the rotation unit 6 to the right in FIG. 1, the sausage 2 will thus be displaced in its longitudinal direction in onto a discharge table 7 which is disposed in connection with the support arrangement 1. At the discharge table 7, there is further provided a retainer unit 8 which includes means 9 which are applicable in a downward direction against the sausage 2 so that the sausage may be retained in place on the discharge table 7.

The support arrangement 1 includes two elongate rotary rollers 10 whose longitudinal directions are parallel with one another and also parallel with the guides 4 and 5. The rollers 10 are supported on a carrier device 11 which permits adjustment of the mutual distance between the rollers so that the support arrangement 1 may thereby be adapted to sausages of different diameters.

The rotation unit 6 includes an upper drive portion 12 which displaceably cooperates with the guide 5 and with the means included in the guide for displacing the drive portion 12 along the guide 5. The drive portion 12 carries a rotary motor 13 which, in one rotational movement in accordance with the arrow 31, is disposed to drive an engagement device 14 which, by the intermediary of pins or projecting tips, engages with the one end of the sausage 2. As a result of displacement of the rotation unit 6 in a direction to the right in FIG. 1, the engagement device 14 may thus be brought into engagement with the sausage 2 so that the tips or drive pins on the engagement device are pressed into the end portion of the sausage. By continued displacement of the rotation unit 6, the sausage may thereby be displaced in its longitudinal direction along the rollers 10. Furthermore, the engagement device 14 may rotate the sausage 2 approximately about its own longitudinal axis in accordance with the arrow 31 at the same time as it is displaced along the rollers 10.

In order to permit adjustment of the apparatus according to the invention to different dimensions of sausages, the engagement device 14 is suitably adjustable both vertically and laterally. In one suitable adjustment position, it is placed approximately intermediately between the rollers and slightly above a plane of connection between their centre axes. This is principally achieved by adjustment in relation to the guide 4. Alternatively, the guide 4 may be adjustable in relation to the support arrangement.

It is correspondingly appropriate that the gripping unit 3 be adjustable both vertically and laterally. In a first alternative, this is accomplished by adjustment in relation to the guide 5. In a second alternative, the guide 5 is adjustable in relation to the support arrangement 1.

Figure 8:
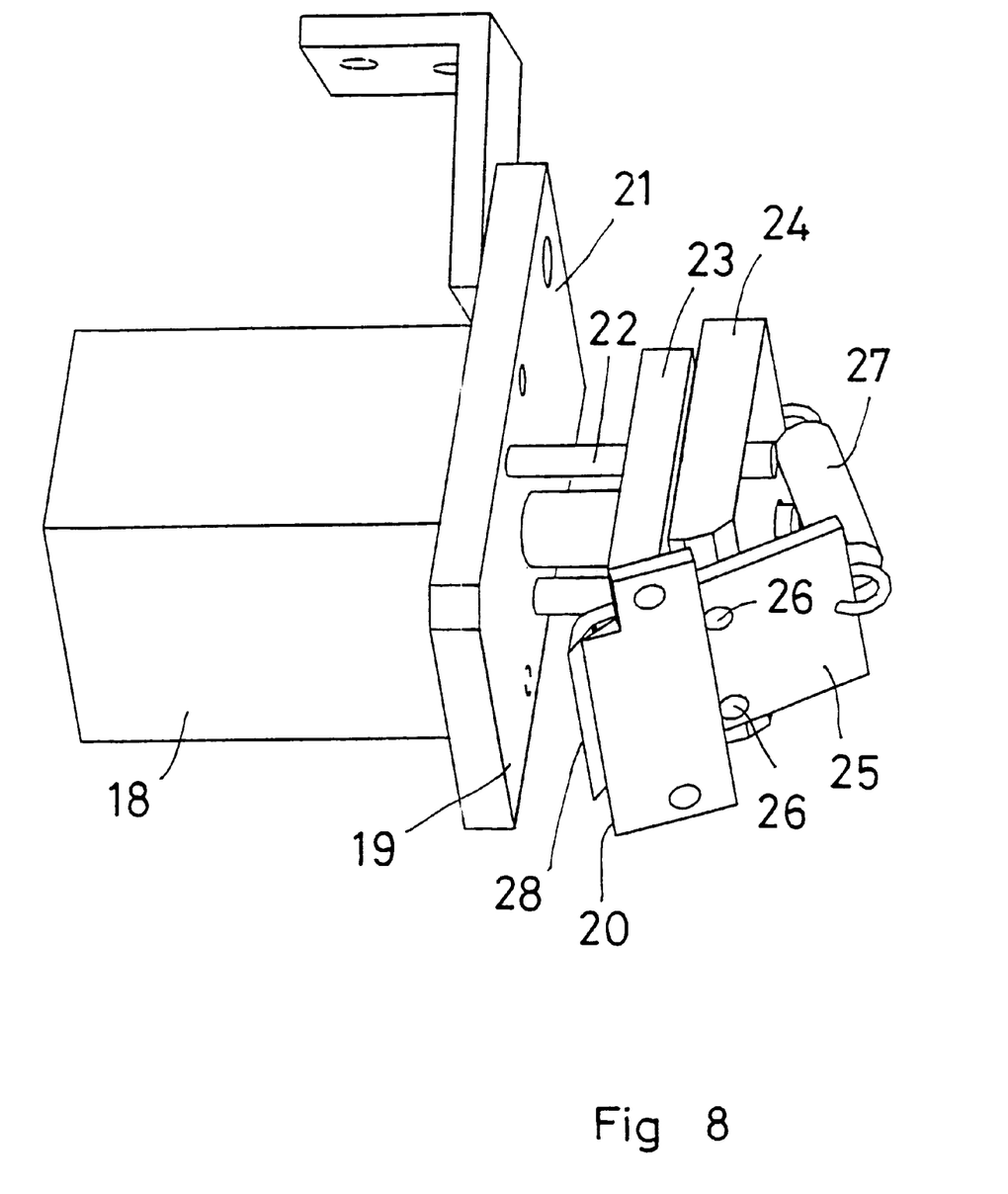
FIG. 8 is a perspective view of a first gripping unit with a knife disposed thereon in the open position.
Figure 9:
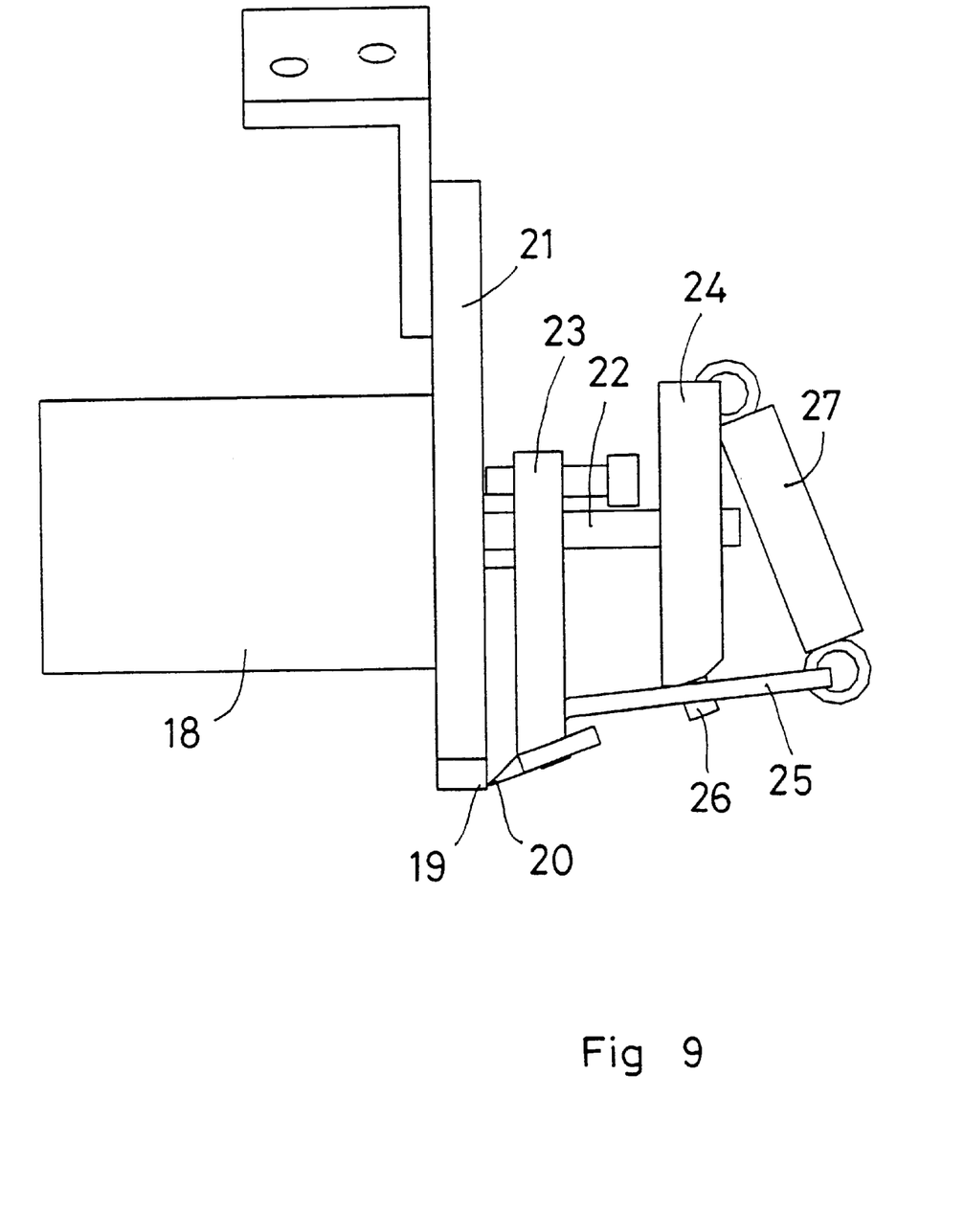
FIG. 9 is a side elevation of the gripping device according to FIG. 8 in the closed position.

The gripping unit 3 includes a first gripper 15 with a knife shown in FIGS. 8 and 9. Further, the gripping unit 3 comprises a second gripper 16. Both the first and second grippers 15 and 16, respectively, are supported by the guide 4 and are displaceable together therealong. To this end, the guide 4 is, as mentioned above, provided with drive means which are interconnected with the gripping unit 3 for reciprocating the gripping unit along the guide.

It will further be apparent from FIG. 1 that the gripping unit 3 includes a transverse guide 17 in which the first gripper 15 is reciprocally displaceable transversely of the longitudinal direction of the sausage 2. Suitably, the direction of displacement is somewhat obliquely inclined so that the direction of displacement and the longitudinal direction of the sausage proper make an angle with one another which is slightly less than 90° so that the first gripper 15, on its transverse displacement, is moved slightly axially in relation to the sausage, in towards the central region thereof.

The second gripper 16 is stationary in relation to the transverse movements of the first gripper 15 and is, therefore, rigidly connected to the stationary parts of the guide 17.

FIGS. 8 and 9 show the first gripper in the open and closed positions, respectively. It will be apparent from these Figures that the first gripper includes drive means 18 preferably designed as a piston and cylinder assembly. The drive means 18 is connected to a plate 21 which is provided with a first, stationary gripping surface 19. Guide pins 22 are secured in the plate 21 along which pins a displaceable part 23 with the second gripping surface 20 is reciprocal towards and away from the first gripping surface 19. Furthermore, the guide pins 22 support a knife holder 24 at whose one edge a knife 25 is tiltably secured by means of pins 26. In such instance, the pins 26 are rigidly anchored in the knife holder 24 and extend through free apertures in the knife 25 so that the knife is restrictedly movable in relation to the knife holder 24. In addition, the knife 25 is pretensioned by means of a spring 27 so that it strives to be pivoted in a counterclockwise direction about the pins 26 (see FIG. 9).

The knife 25 has an edge 28 which is disposed between the gripping surfaces 19 and 20 when these are opened, but which is disposed to be moved aside in that the knife 25 is pivoted under the action of the second gripping surface 20 when this is displaced in a direction towards the stationary, first gripping surface 19. In this instance, the edge 28 will slide along the gripping surface 20 so that these are mutually kept clean and free of particles of meat, skin casing and the like.

Figure 4:
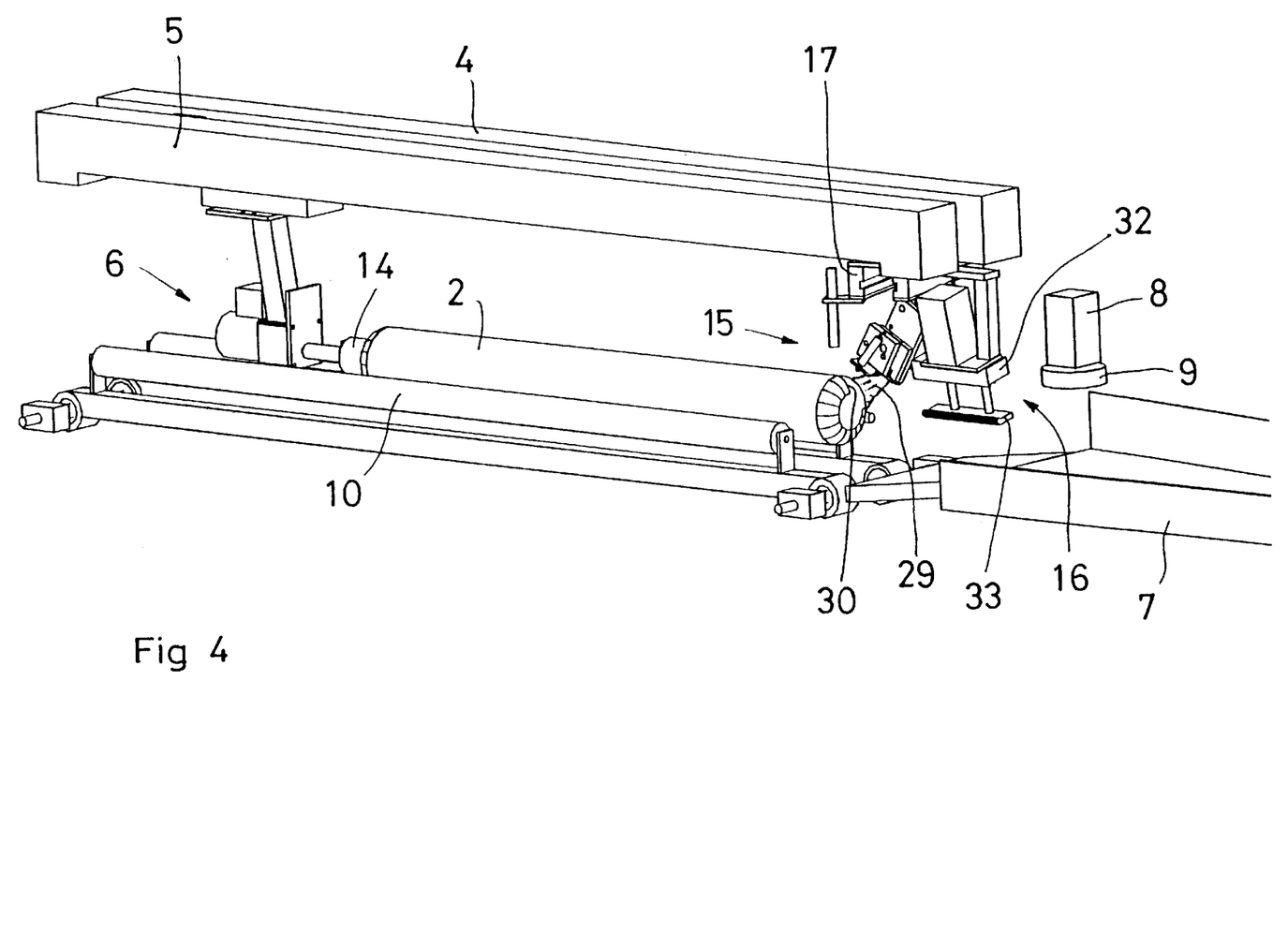

It will be apparent from FIGS. 1 and 8 together that the edge 28 lies approximately in a plane which encompasses the longitudinal axis of the sausage and an upwardly directed radius. This implies that, when the sausage 2 is displaced in a direction to the right in FIG. 1 towards the edge 28, the end region of the sausage will be given an approximately longitudinally directed slit 30 (FIG. 4). Furthermore, the two gripping surfaces 19 and 20 are substantially parallel with the above-mentioned plane.

In the above-disclosed (vertical) plane, the edge 28 is oriented such that it slopes in relation to the substantially horizontal longitudinal direction of the sausage 2 in the order of magnitude of 30°. As a result, it will bisect the longitudinal slit 30 in the end portion of the sausage obliquely from above.

As was mentioned above, the first gripper 15 was disposed in a guide 17 which is displaceable transversely of the longitudinal direction of the sausage 2. Furthermore, the gripping surfaces 19 and 20, as well as the edge 28 are placed in the vertical direction in such a manner that, when the gripper 15 is laterally displaced, this movement will approximately follow a tangent to the sausage 2.

On forward displacement of the sausage 2 towards the first gripper 15, the edge 28 cuts a slit in the sausage. In this instance, the sausage is held urged against the first gripper so that, when this is closed in that the movable gripping surface 20 is moved towards the stationary gripping surface 19, a flap 29 (FIG. 4) of the skin casing of the sausage in conjunction with this slit will be fixedly clamped between the gripping surfaces 19 and 20 at the same time as the knife 25 is pivoted away from the region between the gripping surfaces.

In order reliably to grip the skin casing flap 29 of the sausage, the second gripping surface 20 is disposed as a relatively sharp edge on a wedge-shaped or edged portion which is projected in beneath the skin casing edge.

The above-described apparatus operates in the following manner.

Figure 2:
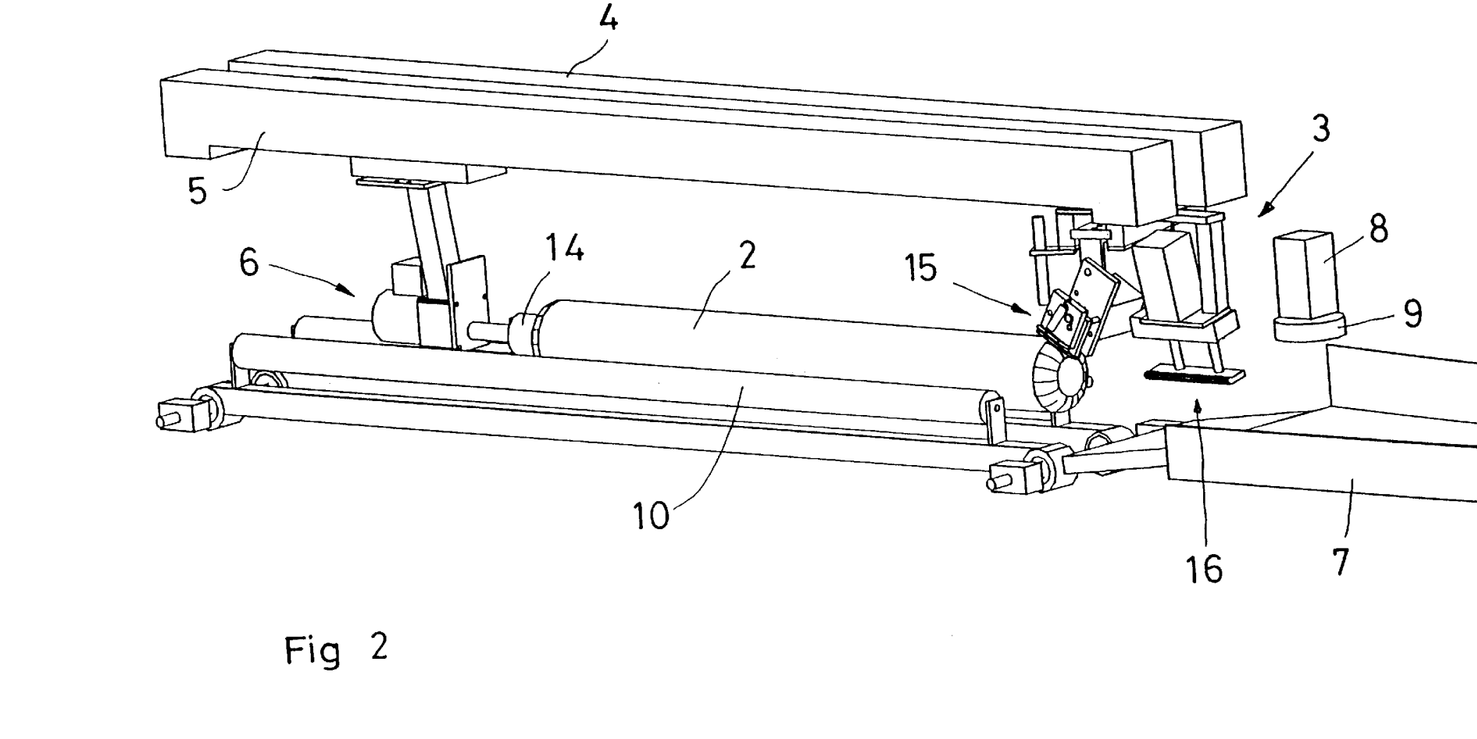

In FIG. 1, the apparatus is shown in the starting position before a working cycle is commenced, with a sausage 2 placed on the rollers 10. In FIG. 2, the rotation unit 6 has been displaced a distance to the right along the guide 5. In this position, the driving tips of the engagement device 14 have been pressed into the end of the sausage 2 and the sausage has been displaced a distance to the right in FIG. 2. The sausage is advanced so far in its direction of movement that it is urged against and slit by the knife which lies exposed between the open gripping surfaces 19 and 20 (FIG. 8). The engagement device 14 does not rotate.

Figure 3:
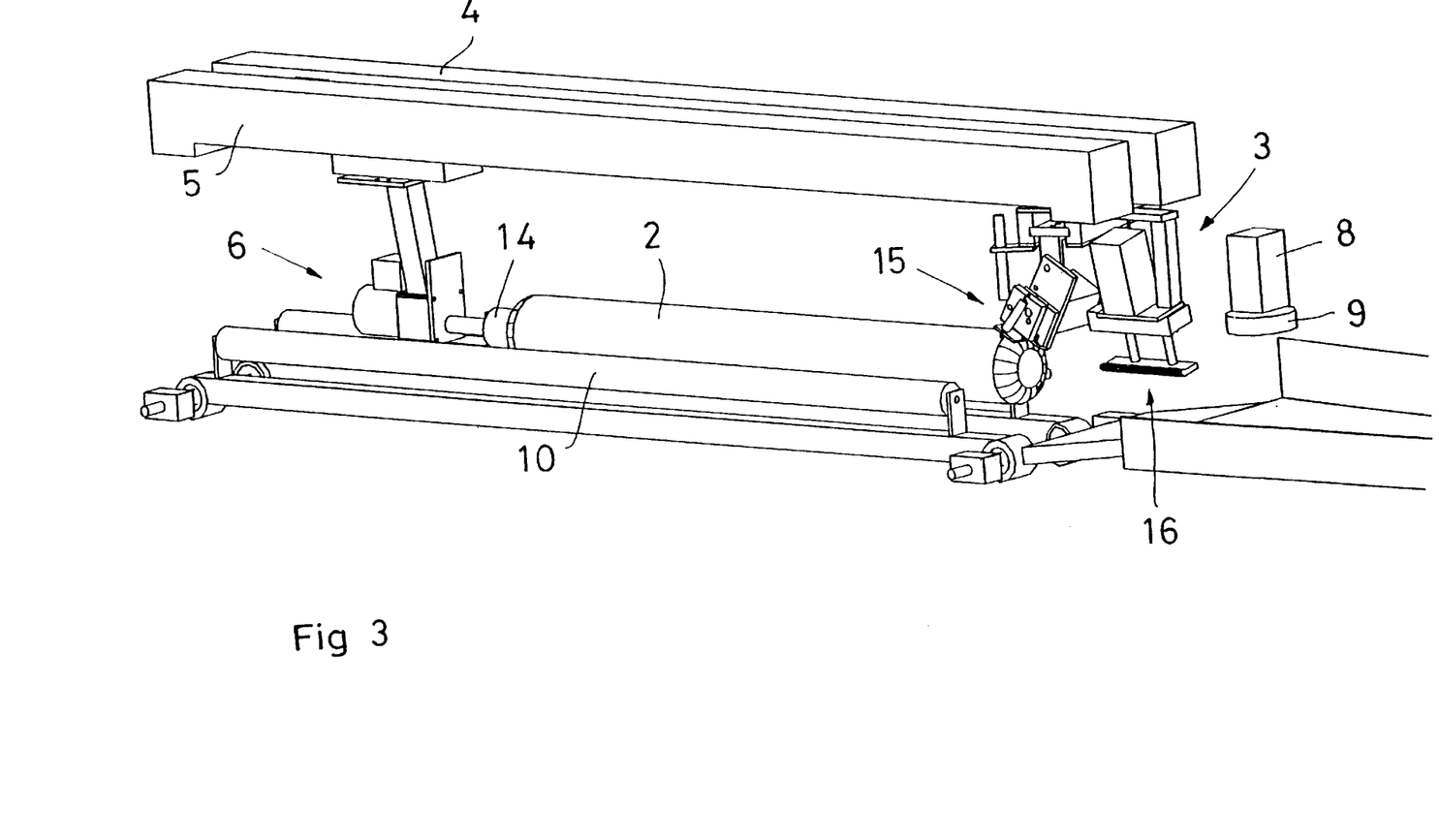

In FIG. 3, the rotation unit 6 still exercises an axial pressure against the sausage 2 without the engagement device 14 having been caused to rotate. The first gripper 15 is still located in its forward end position (closest to the observer of the Drawing Figure), but the gripping surfaces 19 and 20 have been brought together and have gripped a flap of the skin casing of the sausage in the immediate proximity of the slit.

From the position illustrated in FIG. 3, the first gripper 15 is displaced in the transverse guide 17 away from the observer of the Figure towards the rear end position. In the end position, the first gripper is located a slight distance alongside the sausage 2 so that the axial displacement of the sausage is not obstructed by the gripper.

During displacement of the first gripper 15 from the position according to FIG. 3 to the position according to FIG. 4, the rotation of the engagement device 14 is started, so that the sausage may rotate in the counterclockwise direction in accordance with the arrow 31 seen from the end located at the first gripper 15. This rotation movement of the engagement device 14 is suitably started approximately midway into the movement of the first gripper in the guide 17.

In FIG. 4, reference numeral 29 relates to the flap of skin casing clamped between the gripping surfaces 19 and 20 which had been pulled loose from the slit 30 in the sausage.

The axial advancement of the sausage which took place from the position according to FIG. 1 to the position according to FIG. 2 is discontinued during the time it takes to slit the sausage, close the first gripper 15 and laterally displace this gripper out to the position according to FIG. 4. Thereafter, the displacement of the rotation unit 6 along the guide 5 is restarted. However, at the same time displacement of the gripping unit 3 is also commenced along the guide 4 in the opposite direction in relation to the movement of the sausage 2, at the same time as the engagement device 14 rotates the sausage 2 in accordance with the arrow 31 in FIG. 5.

FIG. 4 shows the second gripper 16 in the open position and it will be apparent from this Figure that it has an upper, movable gripping plate 32 and a lower, fixed gripping plate 33. The upper gripping plate 32 is downwardly displaceable along guides into abutment against the lower gripping plate. It will also be apparent from the same Drawing Figure that the skin casing flap 29 is relatively narrow and that it is fixedly clamped against a relatively sharp edge on the second gripping surface 20 (FIG. 9). For this reason, it may possibly be feared that the skin casing flap 29 might break during the final phase of the stripping of the sausage skin casing, since relatively large forces must then be employed. In order to prevent this, the second gripper 16 is used to grip about a larger edge portion of the partly stripped skin casing approximately in the position according to FIG. 5.

Figure 5:
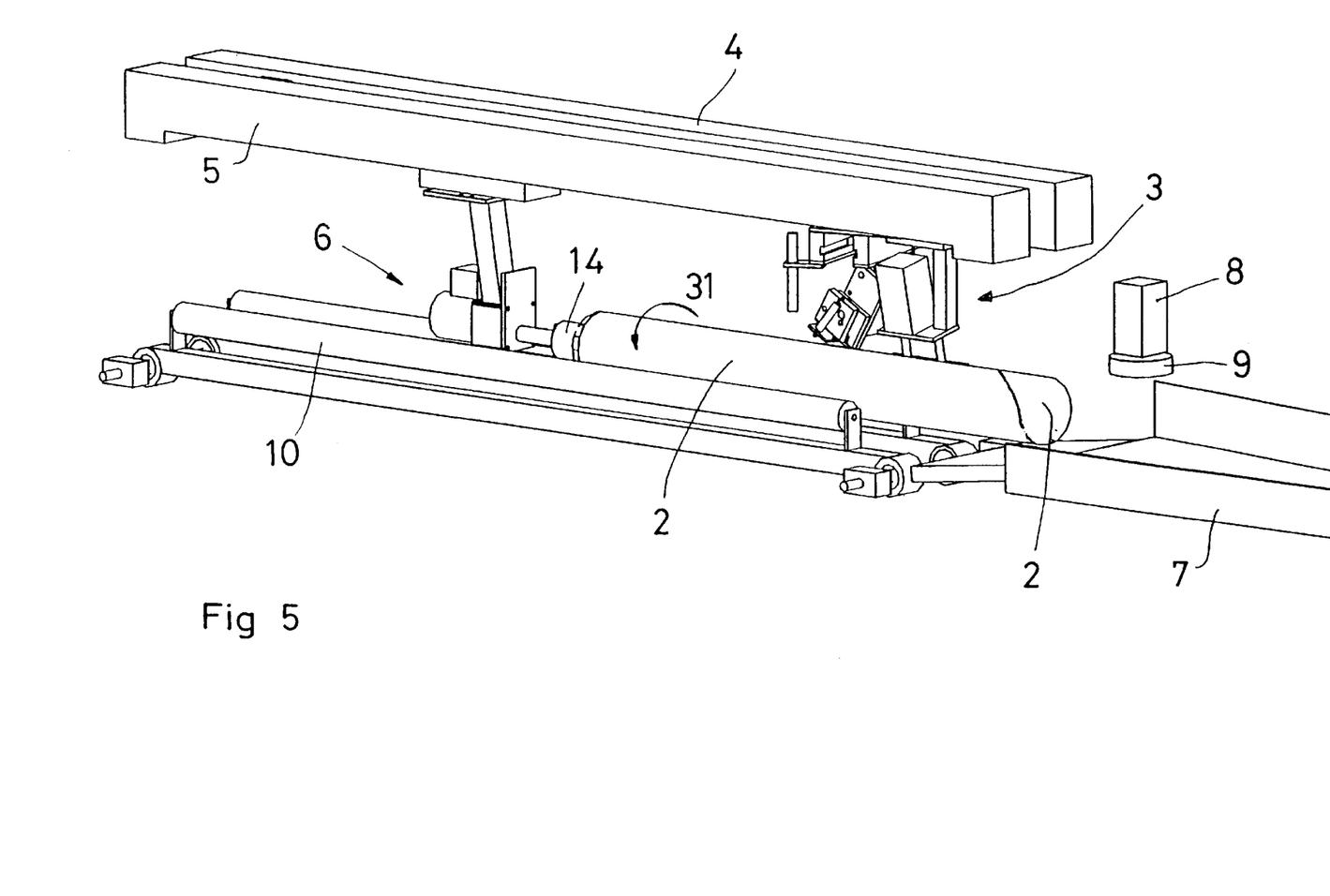
Figure 6:
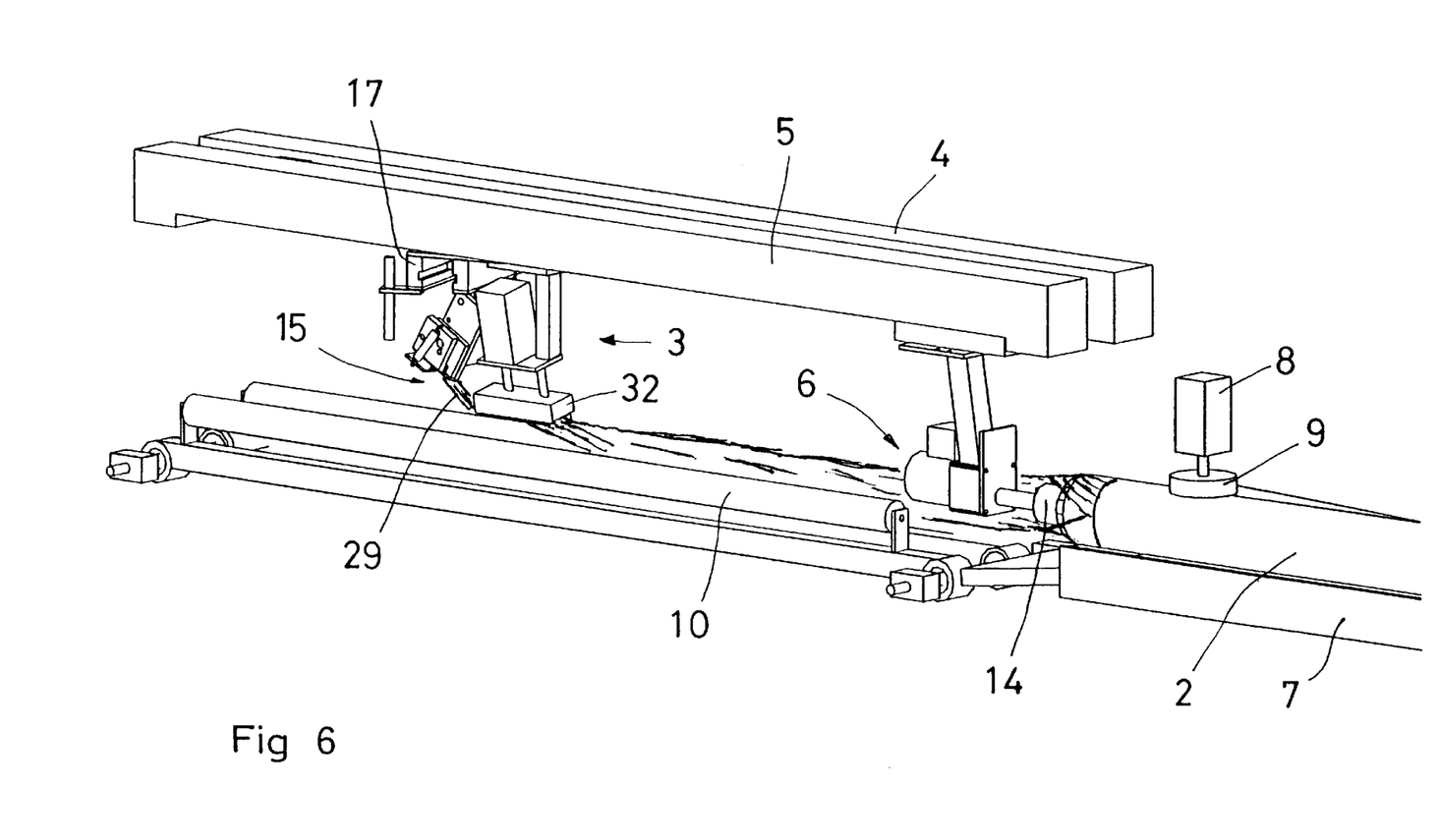
Figure 7:
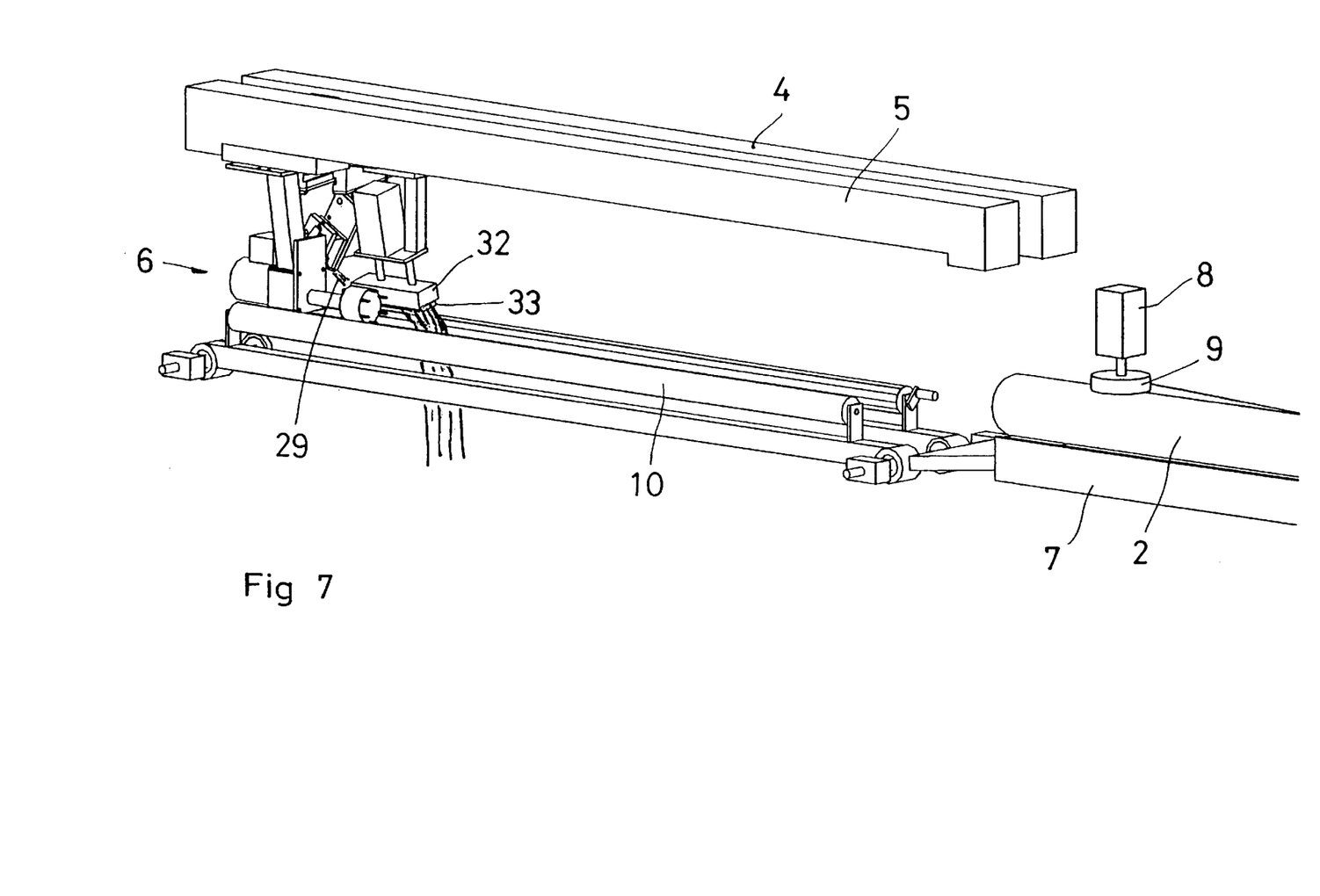

Once the second gripper 16 has been activated approximately in the position according to FIG. 5, the sausage 2 is displaced axially in over the discharge table 7 at the same as it rotates in accordance with the arrow 31. When this procedure has progressed up to the position according to FIG. 6 or possibly just before arrival there, rotation of the engagement device 14 and the rotation unit 6 is arrested. The gripping unit 3 is also temporarily stopped in this position. During this period of rest, the clamping means 9 of the retainer unit 8 is activated so that the sausage 2 is held fixedly clamped against the discharge table 7. When this clamping has been reliably established, the movement of the gripping unit 3 is restarted in a direction to the left in the Drawing, and a return movement of the rotation unit 6 is commenced so that the rotation unit is returned to its starting position. The final position after completed stripping of the sausage skin casing is apparent from FIG. 7. Once the first and second grippers have been opened and the sausage skin casing has been allowed to fall away, the gripping unit 3 is returned to the starting position at the right-hand end of the guide 4, whereafter the apparatus according to the invention is ready for a new working cycle.

The present invention may be modified without departing from the spirit and scope of the appended claims.

What is claimed is:

1. A method of removing a skin casing from a sausage, comprising:

cutting a slit at a first end region of the sausage;

gripping the skin casing of the sausage with a gripper;

displacing the gripper with respect to the sausage in a longitudinal direction of the sausage; and rotating the sausage about its longitudinal axis, at least during a part of the skin casing removal operation, wherein, during gripping, a flap of the skin casing is gripped in an immediate proximity of the slit, and wherein the gripped flap is displaced in relation to the sausage in a direction transverse to the longitudinal direction of the sausage, and approximately tangential to the sausage.

2. A method of removing a skin casing from a sausage, comprising:

cutting a slit at a first end region of the sausage;

gripping the skin casing of the sausage with a gripper;

displacing the gripper with respect to the sausage in a longitudinal direction of the sausage; and rotating the sausage about its longitudinal axis, at least during a part of the skin casing removal operation, wherein, during gripping, a flap of the skin casing is gripped in an immediate proximity of the slit, and the gripped flap is displaced in relation to the sausage in a direction transverse to the longitudinal direction of the sausage, and wherein the sausage starts rotating, and the sausage and the gripper start displacing with respect to one another in the longitudinal direction of the sausage after the flap of the skin casing is gripped.

3. A method of removing a skin casing from a sausage, comprising:

cutting a slit at a first end region of the sausage;

gripping the skin casing of the sausage with a gripper;

displacing the gripper with respect to the sausage in a longitudinal direction of the sausage;

rotating the sausage about its longitudinal axis, at least during a part of the skin casing removal operation; and engaging the sausage with a second gripper after the skin casing is partly removed from the sausage, wherein, during gripping, a flap of the skin casing is gripped in an immediate proximity of the slit, and the gripped flap is displaced in relation to the sausage in a direction transverse to the longitudinal direction of the sausage.

4. A method of removing a skin casing from a sausage, comprising:

cutting a slit at a first end region of the sausage;

gripping the skin casing of the sausage with a gripper;

displacing the gripper with respect to the sausage in a longitudinal direction of the sausage; and rotating the sausage about its longitudinal axis, at least during a part of the skin casing removal operation, wherein, during gripping, a flap of the skin casing is gripped in an immediate proximity of the slit, and the gripped flap is displaced in relation to the sausage in a direction transverse to the longitudinal direction of the sausage, and wherein rotation of the sausage is arrested before the relative displacement of the sausage and the gripper in the longitudinal direction of the sausage is arrested.

5. The method as claimed in claim 4, wherein the sausage is positionally fixed after the rotation has been arrested; and wherein the relative displacement of the sausage and the gripper in the longitudinal direction of the sausage is continued by displacement of the gripper.

6. A method of removing a skin casing from a sausage, comprising:

cutting a slit at a first end region of the sausage;

gripping the skin casing of the sausage with a gripper;

displacing the gripper with respect to the sausage in a longitudinal direction of the sausage; and rotating the sausage about its longitudinal axis, at least during a part of the skin casing removal operation, wherein, during gripping, a flap of the skin casing is gripped in an immediate proximity of the slit, and the gripped flap is displaced in relation to the sausage in a direction transverse to the longitudinal direction of the sausage, and wherein the slit is formed by cutting the sausage skin casing between two gripping surfaces disposed for gripping the flap of the sausage skin casing.

7. An apparatus for removing a skin casing from a sausage, comprising:

a support arrangement for the sausage;

a rotation unit which, by engagement with the sausage, is disposed to rotate the sausage on the support arrangement approximately about a longitudinal axis of the sausage;

a gripping unit including a knife for forming a slit in a first end region of the sausage, and at least a first gripper for gripping a flap of the skin casing in an immediate proximity of the slit; and guides along which the rotation unit and the gripping unit are movable in opposite directions approximately parallel with a longitudinal direction of the sausage for removing the skin casing of the sausage.

8. The apparatus as claimed in claim 7, wherein the gripping unit includes a second gripper, which, in a direction of movement of the gripping unit on removal of the sausage skin casing, is located after the first gripper.

9. The apparatus as claimed in claim 7, wherein the first gripper is disposed to be displaceable transverse to the longitudinal direction of the sausage.

10. The apparatus as claimed in claim 7, wherein the support arrangement includes two rotary, mutually approximately parallel and elongate rollers; the guides for the rotation and gripping units are disposed over the rollers and approximately parallel therewith; and the rotation unit is provided with an engagement device located between and slightly over the rollers, the engagement device being disposed to rotate the sausage and to displace it along the rollers.

11. The apparatus as claimed in claim 10, further comprising: a discharge table, located at a first end of the rollers, wherein the discharge table receives the sausage after it is moved under the action of the rotation unit; and a retainer unit for retaining the sausage on the discharge table.

12. The apparatus as claimed in claim 7, wherein the first gripper includes first and second gripping surfaces, which are movable toward and away from one another and which are approximately parallel with a plane containing a radius and the longitudinal axis of the sausage.

13. The apparatus as claimed in claim 12, wherein an edge of the knife is located between the first and second gripping surfaces when the gripping surfaces are located in an open position.

14. The apparatus as claimed in claim 13, wherein the first gripping surface is stationary while the second gripping surface is movable; and wherein the movable gripping surface is, on its movement toward the stationary gripping surface, disposed to slide along the knife and move the knife aside against a tension action of a spring.

15. The method as claimed in claim 2, wherein the gripped flap is displaced in relation to the sausage in a direction approximately tangential to the sausage.

16. The method as claimed in claim 3, wherein the gripped flap is displaced in relation to the sausage in a direction approximately tangential to the sausage.

17. The method as claimed in claim 4, wherein the gripped flap is displaced in relation to the sausage in a direction approximately tangential to the sausage.

18. The method as claimed in claim 6, wherein the gripped flap is displaced in relation to the sausage in a direction approximately tangential to the sausage.

19. The apparatus as claimed in claim 9, wherein the first gripper is disposed to be displaceable approximately tangential in relation to the sausage.

20. A method for removing a skin casing from a sausage, comprising:

placing the sausage on a support that will allow rotation of the sausage about a longitudinal axis thereof;

cutting a slit in a first end region of the sausage;

gripping a flap of the skin casing in an immediate proximity of the slit with a first gripper and displacing the flap in relation to the sausage in a direction transverse to a longitudinal direction of the sausage; and moving the flap and the sausage in opposite directions with respect to the longitudinal direction of the sausage while rotating the sausage about the longitudinal axis thereof.

21. The method according to claim 20, further including gripping the sausage by a second gripper after the skin casing is partly removed from the sausage.

22. The method according to claim 20, wherein, during displacing, the flap is displaced in a direction approximately tangential to the sausage.

23. A method of removing a skin casing from a sausage, comprising:

cutting a slit in the skin casing at a first end of the sausage to provide a flap;

gripping the flap by means of a gripper;

displacing the gripper in a substantially transverse direction in relation to a longitudinal axis of the sausage; and displacing the gripper and the sausage such that the gripper passes a second end of the sausage and the sausage rotates about the longitudinal axis thereof, the gripper and the sausage being displaced in paths substantially parallel with the longitudinal axis.

24. An apparatus for removing a skin casing from a sausage, comprising:

a support arrangement for supporting the sausage rotatably about a longitudinal axis thereof;

a knife for producing a slit in a first end of the sausage;

a gripping unit for gripping the skin casing in an immediate proximity to the slit, the gripping unit being movable in a direction transverse to a longitudinal direction of the sausage and in a direction approximately tangential to the sausage;

means for relatively displacing the sausage and the gripping unit in the longitudinal direction of the sausage; and means for rotating the sausage about the longitudinal axis thereof.

25. The apparatus according to claim 24, wherein the gripping unit includes a first gripper and a second gripper, the first gripper being arranged for gripping the skin in the immediate proximity of the slit and for laterally drawing the skin from the sausage, and the second gripper being arranged for engaging the sausage downstream from the first gripper with respect to a direction of movement of the gripping unit.

26. The apparatus according to claim 24, further comprising: a discharge table, located at a first end of the support arrangement, wherein the discharge table receives the sausage after the skin casing is removed; and a retainer unit for retaining the sausage on the discharge table.

27. An apparatus for removing a skin casing from a sausage, comprising:

a support arrangement for supporting a sausage;

a rotation unit movably disposed at a first end section of the support arrangement, the rotation unit being adapted to engage and rotate the sausage about a longitudinal axis of the sausage on the support arrangement; and a gripping unit movably disposed at a second end section of the support arrangement and being displaceable substantially transverse to the longitudinal axis of the sausage, the gripping unit having a blade for cutting a slit on the skin casing at an end section of the sausage to produce a flap and at least one gripper for gripping the flap, wherein the rotation unit is movable toward a second end section of the support arrangement in a first path, and the gripping unit is movable toward the first end section of the support arrangement in a second path, the first path and the second path being substantially parallel with the longitudinal axis of the sausage.

* * * * *